(12) United States Patent
Cheng

(10) Patent No.: US 8,262,116 B2
(45) Date of Patent: Sep. 11, 2012

(54) BICYCLE STAND

(76) Inventor: Wen-Jui Cheng, Chiayi County (TW)

( * ) Notice: Subject to any disclaimer, the term of this patent is extended or adjusted under 35 U.S.C. 154(b) by 97 days.

(21) Appl. No.: 12/795,689

(22) Filed: Jun. 8, 2010

(65) Prior Publication Data

US 2011/0012322 A1 Jan. 20, 2011

(30) Foreign Application Priority Data

Jul. 17, 2009 (TW) .............................. 98213042 U

(51) Int. Cl.
*B62H 1/08* (2006.01)
(52) U.S. Cl. ....................................................... 280/294
(58) Field of Classification Search .................. 280/294, 280/293, 288.4, 304; 74/560, 562, 562.5
See application file for complete search history.

(56) References Cited

U.S. PATENT DOCUMENTS

| 626,697 | A | * | 6/1899 | Hart, Jr. ......................... 280/294 |
| 644,074 | A | * | 2/1900 | Hart, Jr. ......................... 280/294 |
| 654,245 | A | * | 7/1900 | Glasser ......................... 280/294 |
| 706,453 | A | * | 8/1902 | Rignall ......................... 280/294 |
| 1,364,407 | A | * | 1/1921 | Palmer et al. ................. 280/294 |
| 3,877,726 | A | * | 4/1975 | Foster ......................... 280/294 |
| 4,030,774 | A | * | 6/1977 | Foster ......................... 280/261 |
| 4,563,017 | A | * | 1/1986 | Kimball ....................... 280/294 |
| 4,605,242 | A | * | 8/1986 | Kimball ....................... 280/294 |
| 2002/0108466 | A1 | * | 8/2002 | Campagnolo ................ 74/594.4 |
| 2010/0201099 | A1 | * | 8/2010 | Teng ............................ 280/294 |

* cited by examiner

*Primary Examiner* — Tashiana Adams
(74) *Attorney, Agent, or Firm* — Rosenberg, Klein & Lee

(57) ABSTRACT

This invention relates to a bicycle stand structure mainly comprising: a pedal pivotally fixed to the crank shaft of bicycle; a locating member attached fixedly to the crank shaft; a clamper provided between the locating member and the pedal; a restorer, such as a spring or a pair of magnetic body arranged with same poles facing oppositely to each other, provided between the clamper and the pedal; and a stand body, which is hinged to the other end of the pedal, to provide handy support for parking bicycle. When bicycle is to be parked, the clamper is engaged in the locating member of the crank shaft so that the stand body is not affected by the spinning of the pedal. Therefore, best stability and safety can be attained.

20 Claims, 11 Drawing Sheets

BICYCLE STAND

BACKGROUND OF THE INVENTION

1. Field of Invention

This invention relates to a bicycle stand structure, more particularly to a bicycle stand structure which can prevent stand body from failing to park bicycle due to spinning of pedal.

2. Brief Description of the Prior Art

A conventional bicycle stand disclosed in a Taiwanese Patent Gazette No. M353890, entitled "Combined Bicycle Pedal and Stand" comprises:

a pedal having an outer protection frame and a hole for fixing near inner side of vertical faces of the outer protection frame;

an axle;

a bicycle stand hinged to the outer protection frame by the axle, a notch being provided on inner side of the bicycle stand for fending crank shaft, a front vertical face and a rear vertical face being provided on the front and rear ends respectively, and projecting bulges opposite to the holes for fixing on the outer protection frame of the pedal being provided on the front and a rear vertical faces respectively;

an elastic device put on the spindle body, both ends of which are connected to the pedal and the bicycle stand respectively, wherein:

the bicycle stand is mounted on the pedal of the bicycle.

However, in practical usage of the above bicycle stand, it is easy to rotate accompanying with the spinning of the pedal due to lack of locating means. Hence, the bicycle stand is not only difficult for bicycle parking but also not safe.

SUMMARY OF THE INVENTION

In view of the disadvantages of above conventional bicycle stand, this invention provides a novel bicycle stand structure having a clamper which is engaged with a locating member provided on the crank shaft. Hence, the pedal can be immobilized without any spinning happened during bicycle parking such that the stand body can be prevented from failing to park bicycle due to spinning of pedal.

According to a preferred embodiment of the present invention, the bicycle stand structure mainly comprises: a pedal pivotally fixed to the crank shaft of bicycle, a locating member being attached fixedly to the crank shaft and a clamper being provided between the locating member and the pedal, a restorer being provided between the clamper and the pedal, and a stand body, hinged to the other end of the pedal, which is convenient for parking the bicycle and is lightweight, artistic and pragmatic.

DETAILED DESCRIPTION OF PREFERRED EMBODIMENTS

The objects, the technical contents and the expected effect of the present invention will become more apparent from the detailed description of the preferred embodiment in conjunction with the accompanying drawings.

Figure 1:
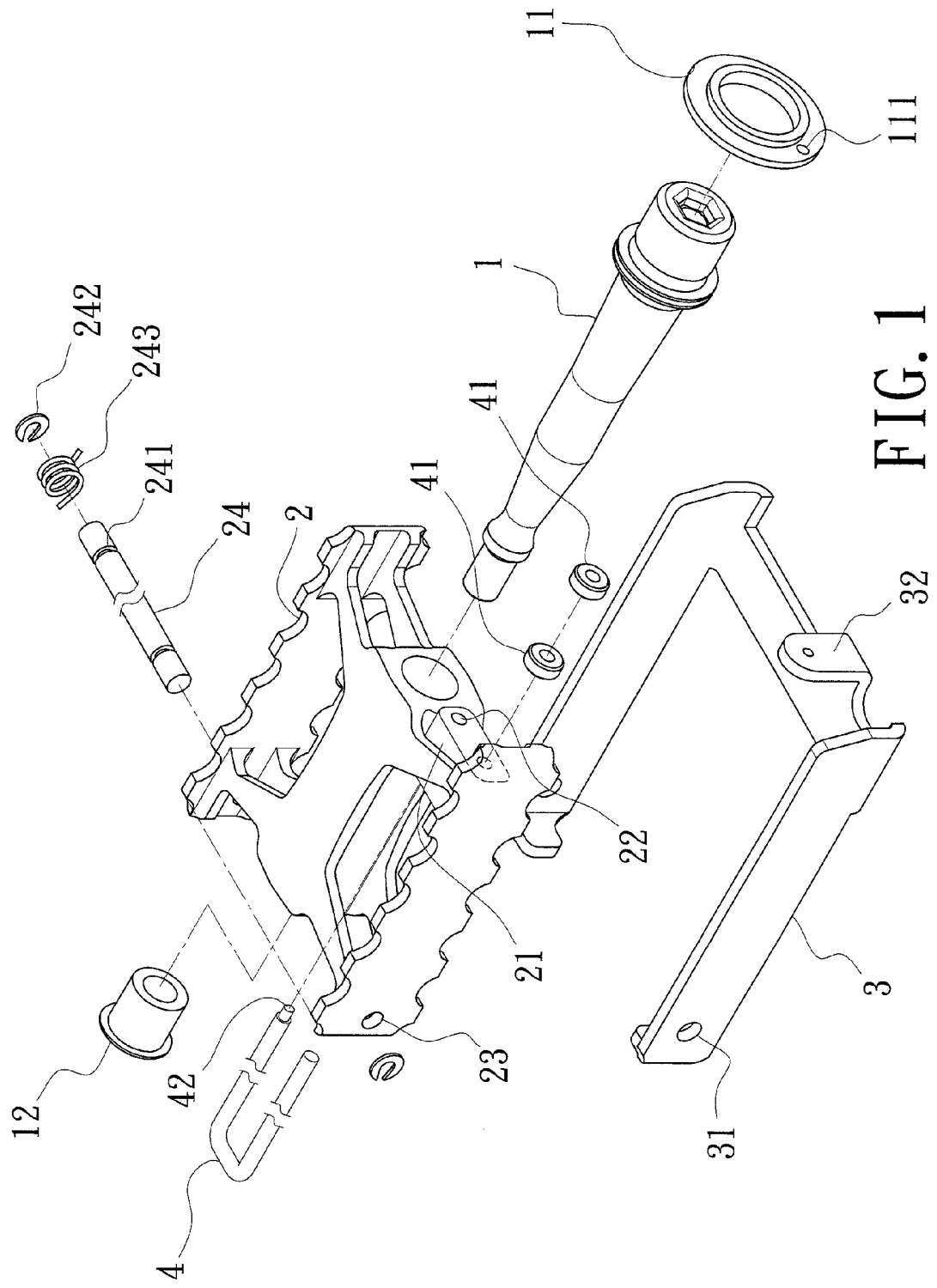
FIG. 1 is a perspective exploded view showing the first embodiment of the bicycle stand structure of the present invention.

Firstly, FIG. 1 is a schematic view showing the first preferred embodiment of the bicycle stand structure of the present invention. Referring to the figure, the bicycle stand structure comprises a crank shaft (1), a pedal (2), a stand body (3) and a clamper (4).

The pedal (2) is pivotally journaled in the crank shaft (1). A locating member (11) is fixedly attached to the inner end of the crank shaft (1). A location hole (111) is provided on the side edge of the locating member (11), which is for penetration by the clamper (4) so as to prevent the pedal (2) from spinning. A fixture (12) is provided on the outer end of the crank shaft (1) for fixing the pedal (2).

A holder (21) is provided on inner end of the pedal (2). Several through holes (22) for penetration by the clamper (4) are provided in the holder (21). Axle bores (23) are provided on both flanks of the pedal (2) respectively, and the stand body (3) is hinged to the Axle bores (23) penetrated by a common axle (24). Peripheral slit grooves (241) are provided on both ends of the axle (24) near the inner sides of the axle bores (23). Retainers (242) are snap-fitted into the peripheral grooves (241) respectively to be located at the inner sides of the axle bores (23), so as to fix the axle (24) along its axial direction. Furthermore, an elastic member (243) is provided on the axle (24) for providing elastic force required. Therefore, best stability and safety can be attained.

Hinge holes (31) are provided on the flanks of both sides of the stand body (3) so that the stand body (3) can be hinged on the axle (24) of the pedal (2). In this way, the stand body (3) is convenient for parking the bicycle and is lightweight, artistic and pragmatic. A blocking section (32) is vertically bended from the inner end of the stand body (3) opposite to the holder (21) of the pedal (2) for blocking the clamper (4).

The clamper (4) is a U-shape rod body, and restoring unit (41), such as a pair of magnetic body arranged with same poles facing oppositely to each other, are put on one end of the clamper (4) so as to provide required restoring force, and a penetrating end (42) is formed on the other end of the clamper for inserting into the location hole (111) of the locating member (11).

Figure 2:
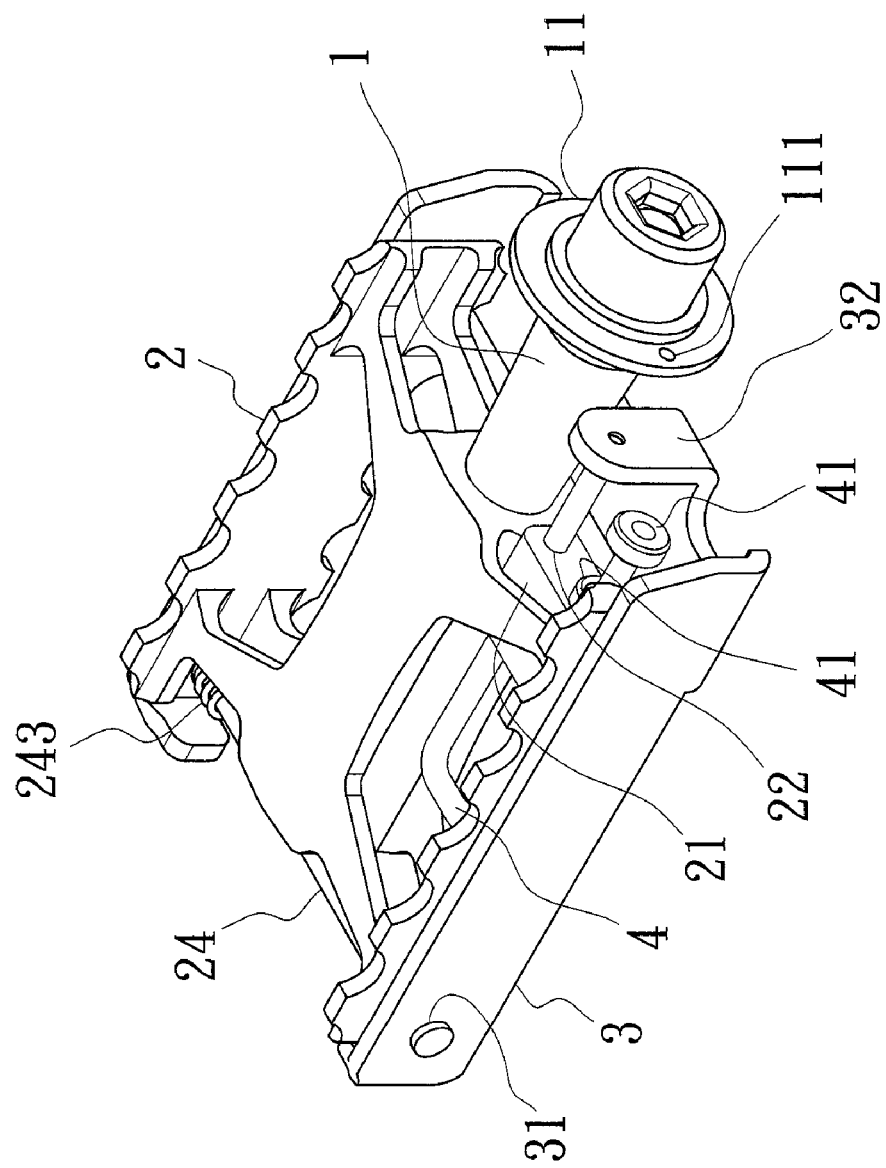
FIG. 2 is a perspective assembled view showing the first embodiment of the bicycle stand structure of the present invention.
Figure 3:
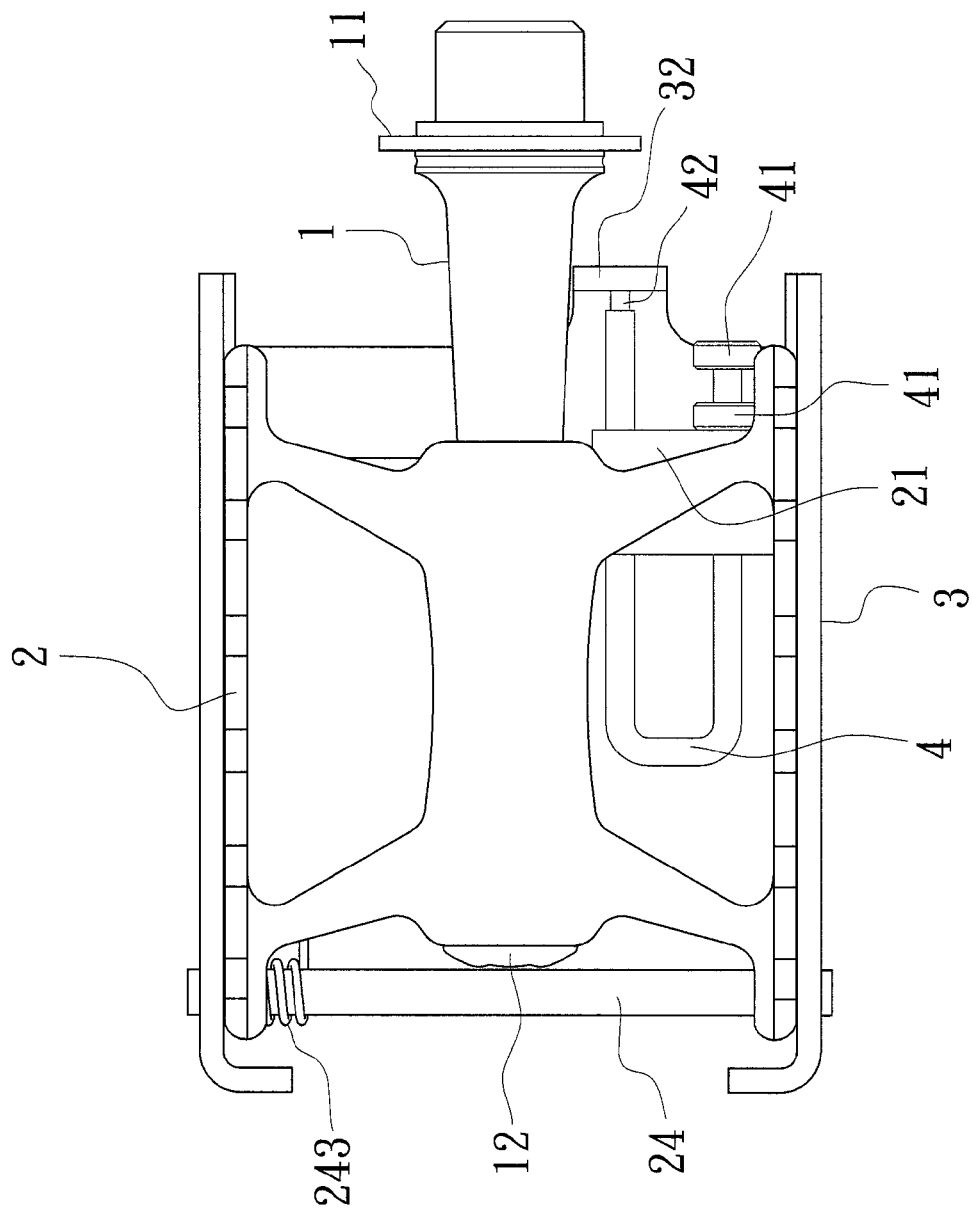
FIG. 3 is an assembled top view showing the first embodiment of the bicycle stand structure of the present invention.

In assembling process, referring to FIGS. 1 to 3, both ends of the clamper (4) penetrate through the through holes (22) on the holder (21) of the pedal (2) respectively, then one restoring unit (41) is abutted against the holder (21) and the hinge holes (31) provided on the flanks of both sides of the stand body (3) are hinged on both ends of the axle (24) of the pedal (2) respectively. While the blocking section (32) of the stand body (3) conducts blocking action on the penetration end (42) of the clamper (4) and is hinged on the crank shaft (1) together with the pedal (2), the stand body (3) and the clamper (4), then the fixture (12) is fixed on the outer end of the crank shaft (1) so as to fix the pedal (2). At this moment, the end of the clamper (4) is just opposite to the location hole (111) of the locating member (11).

Figure 4:
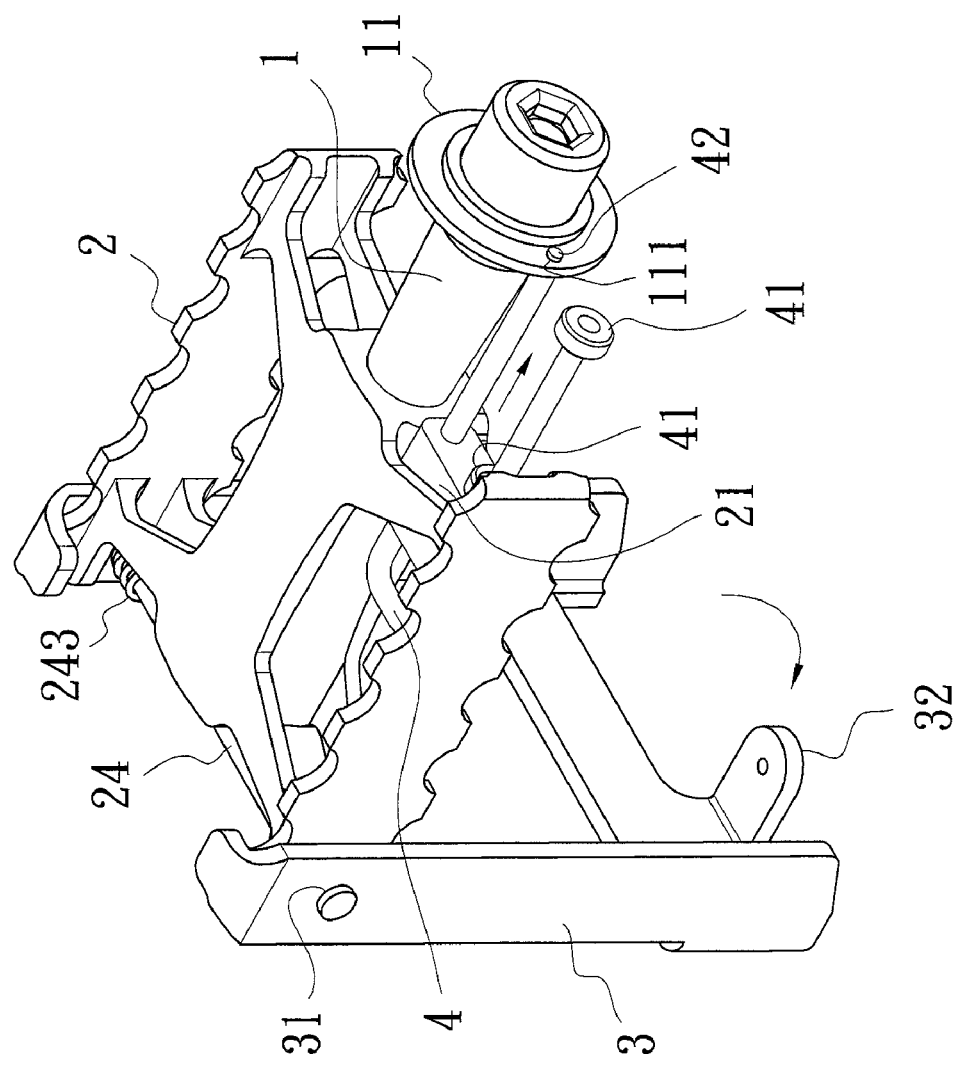
FIG. 4 is a perspective view showing the first embodiment of the bicycle stand structure of the present invention in located status.
Figure 5:
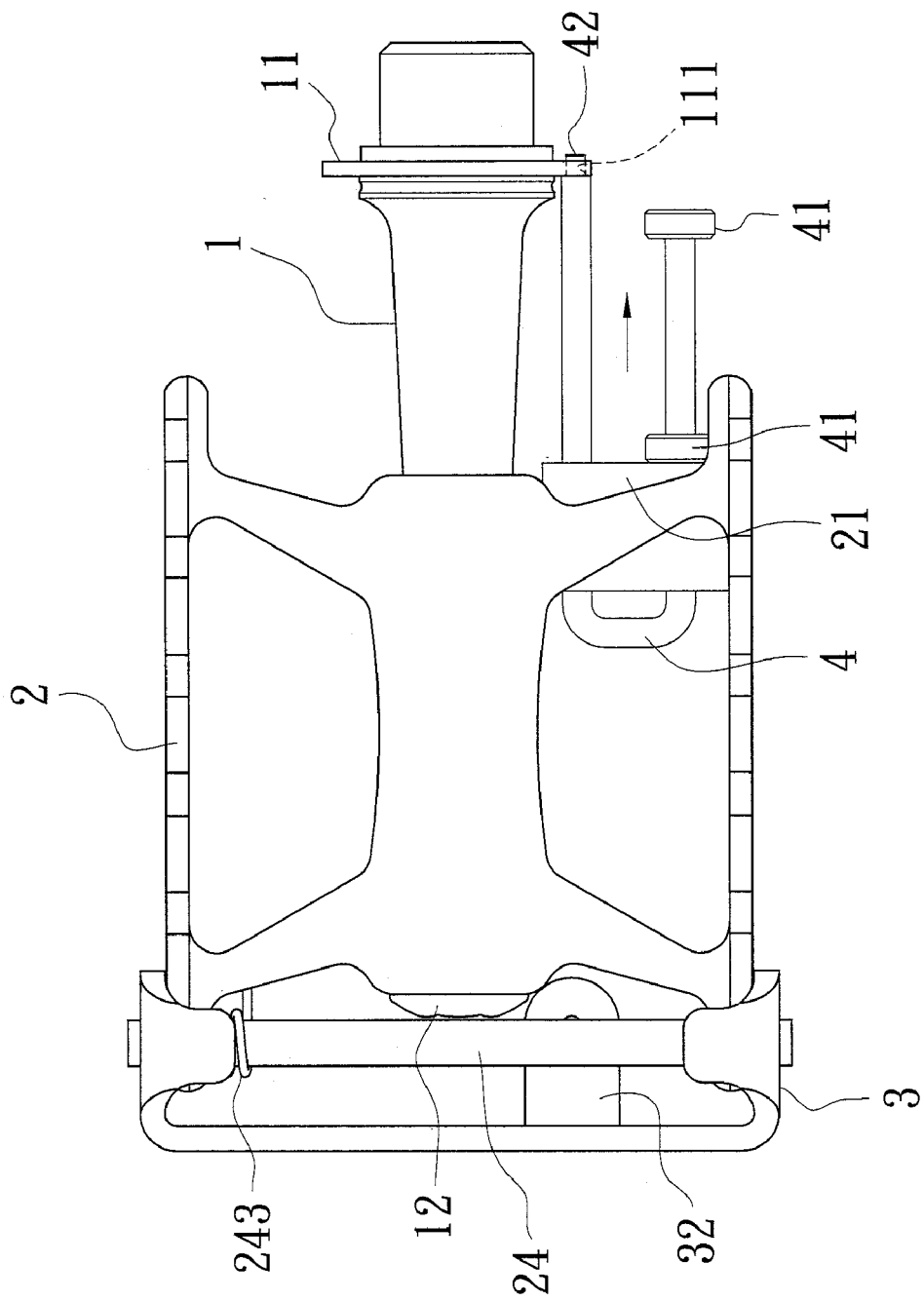
FIG. 5 is a top view showing the first embodiment of the bicycle stand structure of the present invention in located status.

When parking the bicycle, referring to FIGS. 4 and 5, the stand body (3) is firstly rotated outwardly with the axle (24) of the pedal (2) as the center so as to serve as the stand for bicycle. At this moment, as the blocking section (32) is no more block the penetrating end (42) of the clamper (4), the restoring unit (41) forces the clamper (4) moving forward such that the penetrating end (42) of the clamper (4) is inserted into the location hole (111) of the locating member (11). In this manner, the pedal (2) is immobilized and is disabled to spin about the crank shaft (1) so that the stand body (3) is prevented from failing to park bicycle due to spinning of pedal (2). Therefore, best stability and safety can be attained.

Figure 6:
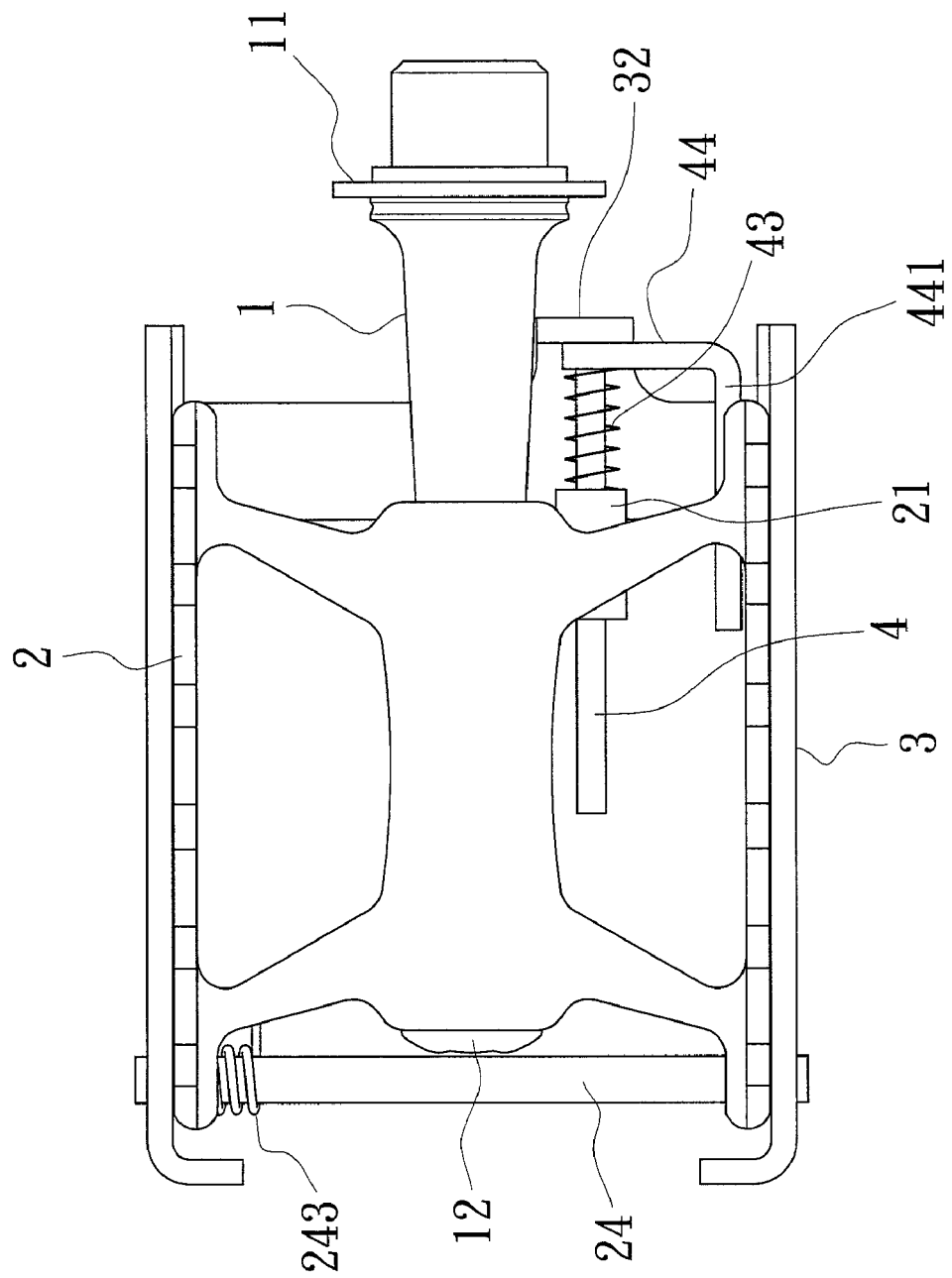
FIG. 6 is an assembled top view showing the second embodiment of the bicycle stand structure of the present invention.
Figure 7:
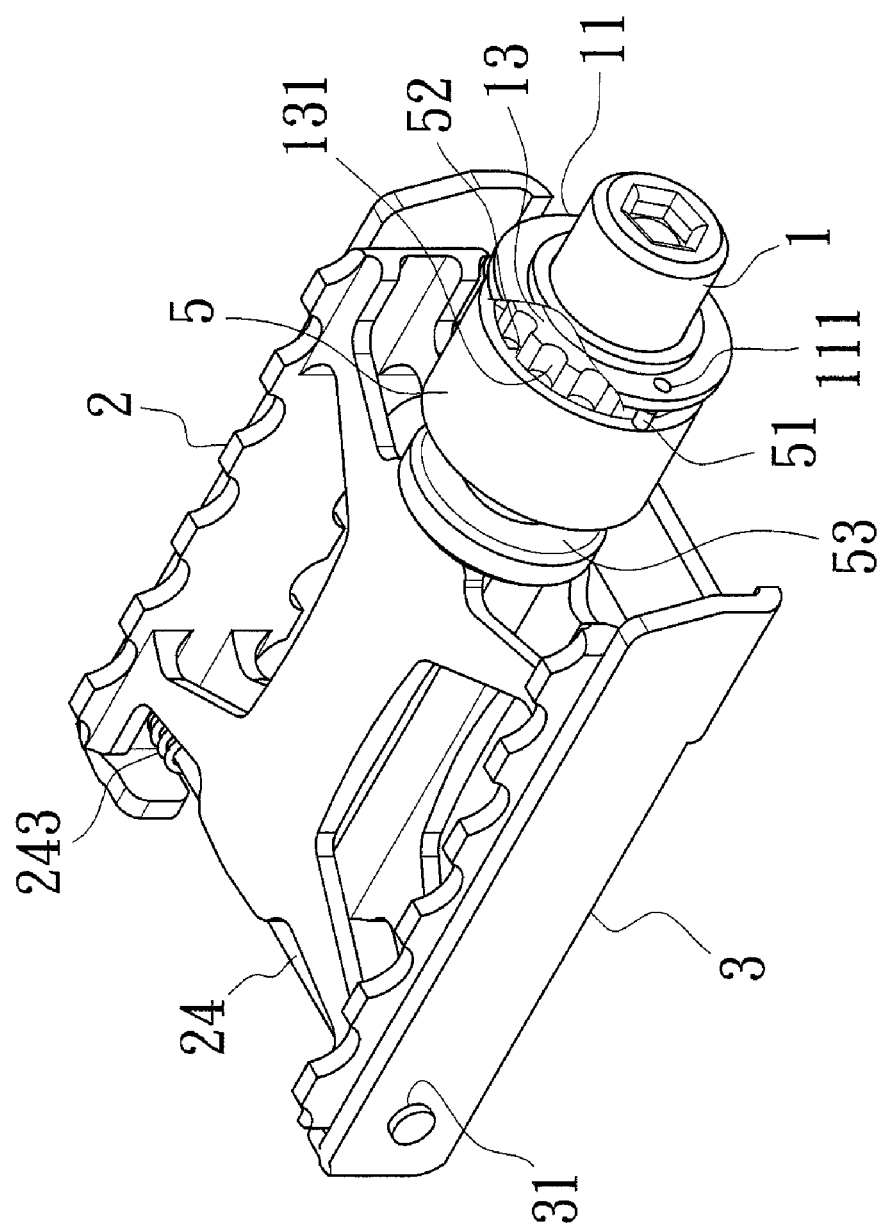
FIG. 7 is a perspective assembled view showing the third embodiment of the bicycle stand structure of the present invention.
Figure 8:
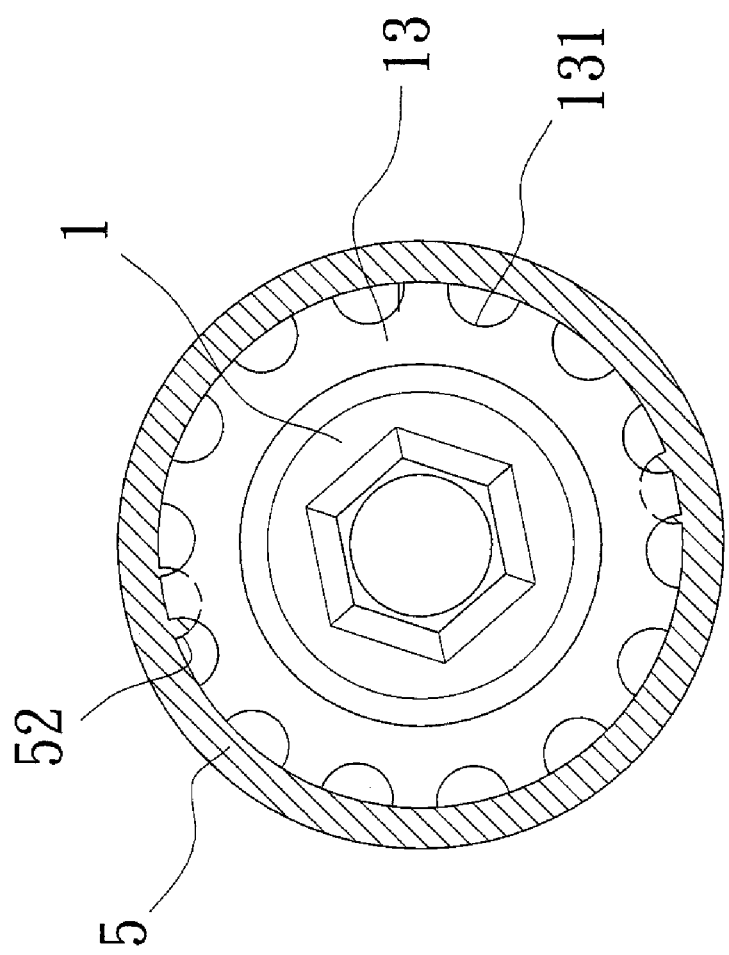
FIG. 8 is a sectional assembled view showing the third embodiment of the bicycle stand structure of the present invention.
Figure 9:
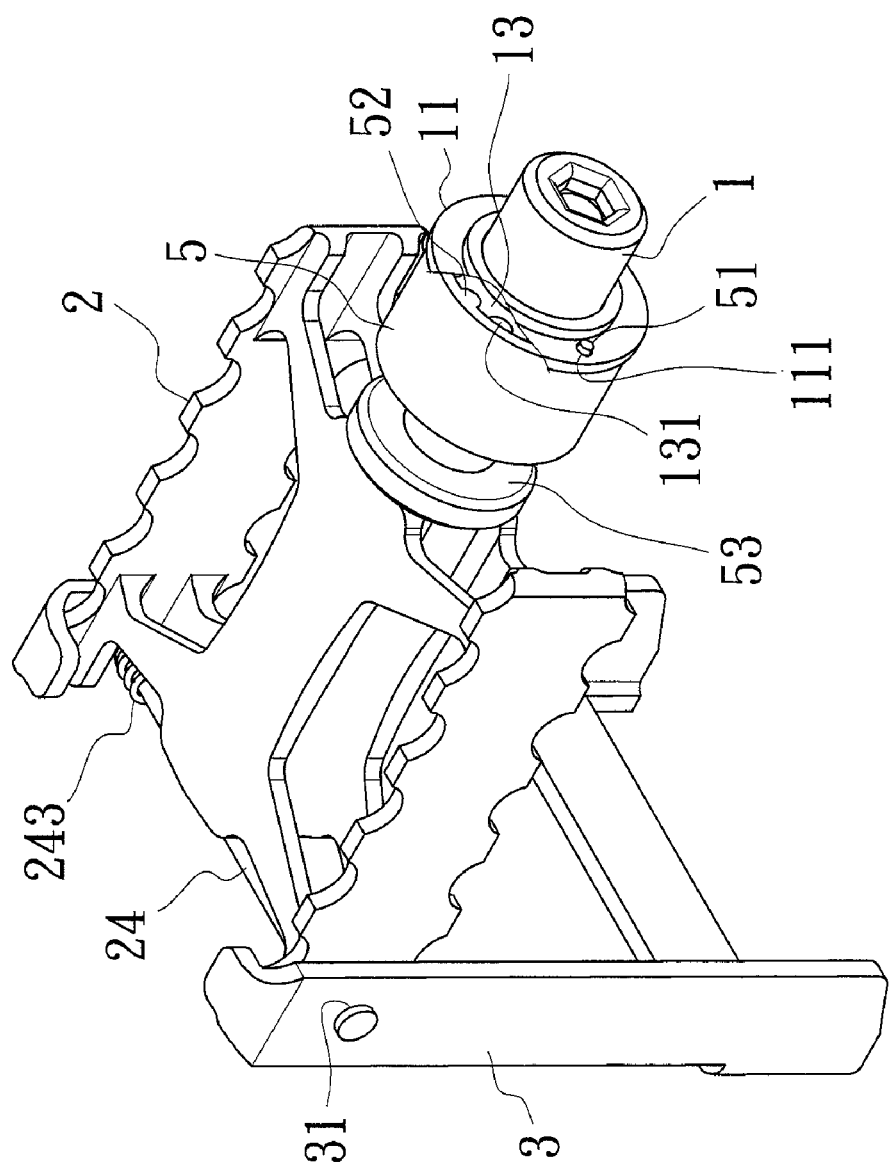
FIG. 9 is a perspective view showing the third embodiment of the bicycle stand structure of the present invention in located status.
Figure 10:
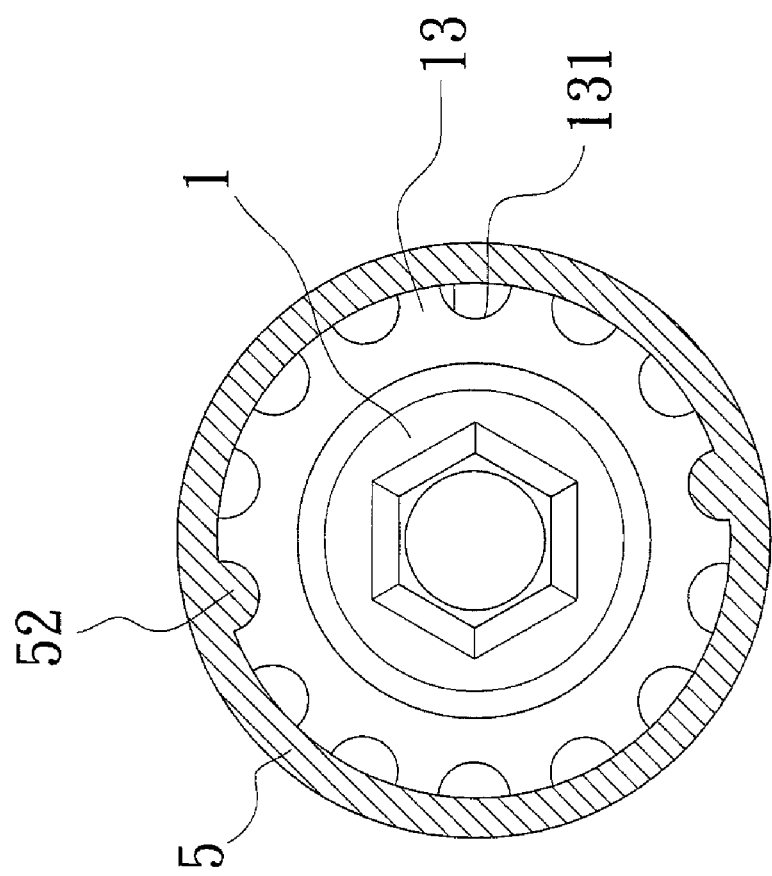
FIG. 10 is a sectional view showing the third embodiment of the bicycle stand structure of the present invention in located status.
Figure 11:
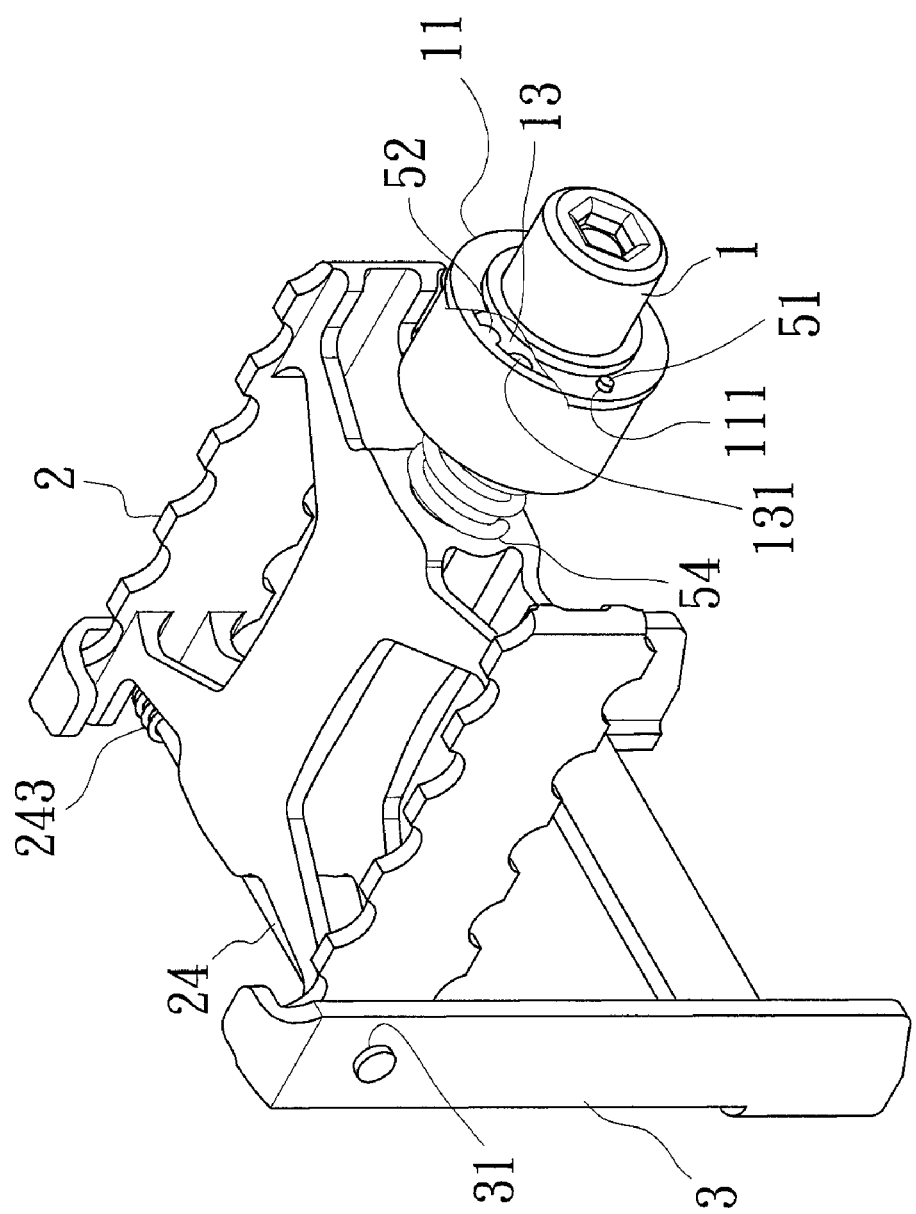
FIG. 11 is a perspective view showing the fourth embodiment of the bicycle stand structure of the present invention in located status.

Further referring to FIG. 6, a second preferred embodiment of the bicycle stand of the present invention is shown. The difference to the first preferred embodiment lies in that the clamper (4) is a lengthwise straight rod body and the restoring unit (43) is a spring for providing required elastic force. A locating piece (44) is put on the clamper (4) to abut against the inner end of the restoring unit (43), and the locating piece (44) has a bended section (441) slidably disposed on the pedal (2). Further referring to FIGS. 7 and 8, a third preferred embodiment of the bicycle stand of the present invention is shown. The crank shaft (1) in this embodiment has a sub-clamper (13) the peripheral edge of which has a plurality of recess (131) forming gear-like shape. The clamper (5) is a cylindrical body put on the crank shaft (1), and a penetrating end (51) for inserting into the location hole (111) of the locating member (11) is formed on the front side of the damper (5). A locating bulge (52) corresponding to the recess (131) is provided on the inner wall of the clamper (5). Restoring unit (53), such as a pair of magnetic body arranged with same poles facing oppositely to each other or a spring as shown in the fourth embodiment of FIG. 11, is clamped between the clamper (5) and the pedal (2). When the stand body is rotated outwardly to serve as a bicycle stand, referring to FIGS. 9 and 10, the clamper (5) is rotated so as to allow the locating bulge (52) opposite to anyone recess (131) of the sub-clamper (13). Simultaneously, the restoring unit (53) or (54) pushes the clamper (5) forward such that the penetrating end (51) and the locating bulge (52) are engaged with the location hole (111) and recess (131) respectively. In this manner, the stand body (3) can be prevented from failing to park the bicycle due to spinning of the pedal (2). Therefore, best stability and safety can be attained. However, the above embodiments or drawings are not intended to restrict product aspect, type of restoring unit or usage mode of the present invention. Various modifications and variations conducted by the person having general knowledge in the field are considered to be within the scope of the present invention which is defined by the appended claims.

It is apparent from the above component constitution and implementation, the present invention has the advantages set forth below when comparing with conventional art.

1. The pedal of the present invention is provided with a clamper. When parking the bicycle, the clamper penetrates into the location hole of the crank shaft so that the stand body is prevented from failing to park the bicycle due to spinning of the pedal. Therefore, best stability and safety can be attained.

In the present invention, a restoring unit, such as a spring or a pair of magnetic body arranged with same poles facing oppositely to each other, is put on the clamper so as to provide required elastic force for usage.

What is claimed is:

1. A bicycle stand structure, comprising: a crank shaft, a pedal pivotally fixed to the crank shaft, a locating member attached fixedly to the crank shaft and a clamper provided between the locating member and the pedal, a restoring unit provided between the clamper and the pedal and a stand body hinged to the other end of the pedal;
   wherein said crank shaft has a sub-clamper the peripheral edge of which has a plurality of recess; said clamper being put on said crank shaft; a locating bulge corresponding to the recess being provided on the said clamper.

2. The bicycle stand structure as claimed in claim 1, wherein said locating member has a location hole which is to be penetrated by a penetrating end formed on said clamper when parking the bicycle, and said stand body has a blocking section to be abutted with said penetrating end.

3. The bicycle stand structure as claimed in claim 1, wherein said restoring unit is a pair of magnetic body arranged with the same poles facing oppositely to each other.

4. The bicycle stand structure as claimed in claim 1, wherein said clamper has a locating piece put on the clamper to abut against the inner end of the restoring unit, and the locating piece has a bended section slidably disposed on said pedal.

5. The bicycle stand structure as claimed in claim 4, wherein said restoring unit is a spring.

6. The bicycle stand structure as claimed in claim 1, wherein said pedal is provided with axle bores to be penetrated by an axle, and said stand body is provided with hinge holes through which said axle penetrate to serve as a pivot.

7. The bicycle stand structure as claimed in claim 6, wherein peripheral slit grooves are provided opposite to said axle bores, retainers being snap-fitted into the peripheral slit grooves at the inner sides of the axle bores, an elastic member being provided on the axle.

8. A bicycle stand structure, comprising: a crank shaft, a pedal pivotally fixed to the crank shaft, a locating member attached fixedly to the crank shaft and a clamper provided between the locating member and the pedal, a restoring unit provided between the clamper and the pedal and a stand body hinged to the other end of the pedal;
   wherein said clamper has a locating piece put on the clamper to abut against the inner end of the restoring unit, and the locating piece has a bended section slidably disposed on said pedal.

9. The bicycle stand structure as claimed in claim 8, wherein said locating member has a location hole which is to be penetrated by a penetrating end formed on said clamper when parking the bicycle, and said stand body has a blocking section to be abutted with said penetrating end.

10. The bicycle stand structure as claimed in claim 8, wherein said crank shaft has a sub-clamper the peripheral edge of which has a plurality of recess; said clamper being put on said crank shaft; a locating bulge corresponding to the recess being provided on the said clamper.

11. The bicycle stand structure as claimed in claim 8, wherein said restoring unit is a pair of magnetic body arranged with the same poles facing oppositely to each other.

12. The bicycle stand structure as claimed in claim 8, wherein said restoring unit is a spring.

13. The bicycle stand structure as claimed in claim 8, wherein said pedal is provided with axle bores to be penetrated by an axle, and said stand body is provided with hinge holes through which said axle penetrate to serve as a pivot.

14. The bicycle stand structure as claimed in claim 13, wherein peripheral slit grooves are provided opposite to said axle bores, retainers being snap-fitted into the peripheral slit grooves at the inner sides of the axle bores, an elastic member being provided on the axle.

15. A bicycle stand structure, comprising: a crank shaft, a pedal pivotally fixed to the crank shaft, a locating member attached fixedly to the crank shaft and a clamper provided between the locating member and the pedal, a restoring unit provided between the clamper and the pedal and a stand body hinged to the other end of the pedal;
   wherein said pedal is provided with axle bores to be penetrated by an axle, and said stand body is provided with hinge holes through which said axle penetrate to serve as a pivot; and
   peripheral slit grooves are provided opposite to said axle bores, retainers being snap-fitted into the peripheral slit grooves at the inner sides of the axle bores, an elastic member being provided on the axle.

16. The bicycle stand structure as claimed in claim 15, wherein said locating member has a location hole which is to be penetrated by a penetrating end formed on said clamper when parking the bicycle, and said stand body has a blocking section to be abutted with said penetrating end.

17. The bicycle stand structure as claimed in claim 15, wherein said crank shaft has a sub-clamper the peripheral edge of which has a plurality of recess; said clamper being put on said crank shaft; a locating bulge corresponding to the recess being provided on the said clamper.

18. The bicycle stand structure as claimed in claim 15, wherein said restoring unit is a pair of magnetic body arranged with the same poles facing oppositely to each other.

19. The bicycle stand structure as claimed in claim 15, wherein said clamper has a locating piece put on the clamper to abut against the inner end of the restoring unit, and the locating piece has a bended section slidably disposed on said pedal.

20. The bicycle stand structure as claimed in claim 19, wherein said restoring unit is a spring.

\* \* \* \* \*